US008937866B2

(12) United States Patent
Slothouber

(10) Patent No.: US 8,937,866 B2
(45) Date of Patent: Jan. 20, 2015

(54) NETWORK BANDWIDTH REGULATION USING TRAFFIC SCHEDULING

(71) Applicant: FourthWall Media, Inc., Dalles, VA (US)

(72) Inventor: Louis P. Slothouber, Leesburg, VA (US)

(73) Assignee: FourthWall Media, Dulles, VA (US)

(*) Notice: Subject to any disclaimer, the term of this patent is extended or adjusted under 35 U.S.C. 154(b) by 153 days.

(21) Appl. No.: 13/660,476

(22) Filed: Oct. 25, 2012

(65) Prior Publication Data
US 2013/0100810 A1     Apr. 25, 2013

Related U.S. Application Data

(60) Provisional application No. 61/551,203, filed on Oct. 25, 2011.

(51) Int. Cl.
| | | |
|---|---|---|
| H04L 12/26 | (2006.01) | |
| H04L 12/911 | (2013.01) | |
| H04L 12/24 | (2006.01) | |

(Continued)

(52) U.S. Cl.
CPC .......... *H04L 47/781* (2013.01); *H04L 43/0882* (2013.01); *H04L 41/147* (2013.01); *H04L 41/0896* (2013.01); *H04L 47/823* (2013.01); *H04L 47/801* (2013.01); *H04L 47/822* (2013.01); *H04L 47/12* (2013.01)
USPC ....................................................... 370/235

(58) Field of Classification Search
CPC .............. H04L 41/0896; H04L 41/147; H04L 43/0882; H04L 47/781; H04L 47/822; H04L 47/823

USPC .................................................. 370/229–235
See application file for complete search history.

(56) References Cited

U.S. PATENT DOCUMENTS

| | | |
|---|---|---|
| 5,991,633 A | 11/1999 | Corriveau |
| 6,381,228 B1 | 4/2002 | Prieto, Jr. |

(Continued)

OTHER PUBLICATIONS

Wikipedia, "Best effort delivery," http://en.wikipedia.org/wiki/Best_effort_delivery, Nov. 5, 2009.

(Continued)

*Primary Examiner* — Gary Mui
(74) *Attorney, Agent, or Firm* — Hunton & Williams LLP

(57) ABSTRACT

Disclosed herein are systems and methods for regulating network bandwidth by means of monitoring network traffic, predicting network loads, and scheduling traffic utilizing traffic reporting and bandwidth reservation mechanisms. These systems and methods may reduce network congestion and support more efficient processing by network applications. Traffic reporting may comprise broadcasting control messages to network nodes indicating appropriate times to send and receive messages. Network nodes may use traffic reports (e.g., control messages) to proactively regulate their use of the network. Bandwidth reservation may allow network nodes to do productive processing while waiting to send and receive data, and may decrease mean wait times. Reservations may be implemented in a synchronous or asynchronous manner. In an exemplary embodiment, the reservation mechanism may emulate a traditional stream socket API. Embodiments enabling enhanced TV applications to run more effectively over cable TV out-of-band networks are described.

24 Claims, 12 Drawing Sheets

(51) Int. Cl.
*H04L 12/927* (2013.01)
*H04L 12/801* (2013.01)

(56) References Cited

U.S. PATENT DOCUMENTS

| | | | |
|---|---|---|---|
| 6,452,915 | B1 | 9/2002 | Jorgensen |
| 6,578,077 | B1 | 6/2003 | Rakoshitz |
| 6,658,010 | B1 | 12/2003 | Enns |
| 7,333,495 | B2 | 2/2008 | Sala |
| 7,724,660 | B2 | 5/2010 | Segel |
| 7,764,604 | B2 | 7/2010 | Kye |
| 7,769,028 | B2 | 8/2010 | Boley |
| 7,856,497 | B2 | 12/2010 | McKinnon, III |
| 7,869,460 | B2 | 1/2011 | Kwon |
| 7,903,682 | B2 | 3/2011 | Beser |
| 7,911,946 | B2 | 3/2011 | Poli |
| 7,916,644 | B2 | 3/2011 | Pularikkal |
| 7,920,594 | B2 | 4/2011 | Carlson |
| 8,069,465 | B1 * | 11/2011 | Bartholomay et al. ....... 725/116 |
| 2005/0054288 | A1 | 3/2005 | Agarwal |
| 2005/0174938 | A1 | 8/2005 | Richardson |
| 2008/0192752 | A1 | 8/2008 | Hyslop |
| 2008/0212591 | A1 | 9/2008 | Wu |
| 2009/0063983 | A1 | 3/2009 | Amidon |
| 2009/0252172 | A1 | 10/2009 | Hare |
| 2010/0220622 | A1 | 9/2010 | Wei |
| 2010/0299715 | A1 * | 11/2010 | Slothouber et al. ........... 725/118 |

OTHER PUBLICATIONS

Wikipedia, "Tail drop," http://en.wikipedia.org/wiki/Tail_drop, Jan. 26, 2010.

Wikipedia, "Active Queue Management," http://en.wikipedia.org/wiki/Active_Queue_Management, May 24, 2010.

Wikipedia, "TCP congestion avoidance algorithm," http://en.wikipedia.org/wiki/TCP_congestion_avoidance_algorithm, May 26, 2010.

Wikipedia, "Explicit Congestion Notification," http://en.wikipedia.org/wiki/Explicit_Congestion_Notification, Apr. 24, 2010.

Wikipedia, "Network congestion avoidance," http://en.wikipedia.org/wiki/Network_congestion_avoidance, Aug. 22, 2009.

Wikipedia, "Traffic shaping," http://en.wikipedia.org/wiki/Traffic_shaping, Apr. 13, 2010.

Wikipedia, "Quality of service," http://en.wikipedia.org/wiki/Quality_of_service, May 2, 2010.

"NetEqualizer Support Archives," http://netequalizernews.com/netequalizer-support-archives/.

Wikipedia, "IEEE 802.1p," http://en.wikipedia.org/wiki/IEEE_802.1p, Feb. 16, 2010.

IETF Network Working Group, "Resource ReSerVation Protocol (RSVP)," RFC 2205, Sep. 1997, http://tools.ietf.org/html/rfc2205.

Venkatesh Sunkad, "Quality-of-Service: A DOCSIS/ PacketCable™ Perspective—Part I," CableLabs, May-Jun. 2000, http://www.cablelabs.com/news/newsletter/SPECS/MayJune2000/news.pgs/story5.html.

Wen-Kuang Kuo, Sunil Kumar, and C.-C. Jay Kuo, "Improved Priority Access, Bandwidth Allocation and Traffic Scheduling for DOCSIS Cable Networks," IEEE Transactions on Broadcasting, vol. 49, No. 4, Dec. 2003, pp. 371-382, http://attila.sdsu.edu/~kumar/Papers/Paper_broadcasting.pdf.

Jon Iwanaga, "MoCA 1.1 spec improves HD home video network performance," *Video Imaging DesignLine*, Feb. 22, 2008, http://www.videsignline.com/showArticle.jhtml;jsessionid=IQXYXQD0X5KJHQE1GHRSKH4ATMY32JVN?articleID=206801239&queryText=moca+1.1.

"MoCA Protocols: What exactly is the MoCA thing?," Technology Conference, Nov. 14-15, 2007, http://www.mocalliance.org/industry/presentations/2007_11_14_TechConference/docs/MoCAProtocols.pdf.

International Search Report from PCT/US 12/61844 dated Dec. 28, 2012.

* cited by examiner

NETWORK BANDWIDTH REGULATION USING TRAFFIC SCHEDULING

FIELD OF THE DISCLOSURE

The invention relates generally to systems and methods for regulating network bandwidth. More specifically, various exemplary embodiments relate to traffic reporting and bandwidth reservation mechanisms.

BACKGROUND

With the continued proliferation of communications networks; from the Internet to cable TV, IPTV, mobile broadband, WiFi, and home networks; and an ever-growing demand for data to be sent over these networks; concerns about network congestion are becoming more pervasive. As fast as larger pipes can be provided, user demand threatens to fill them. Best-effort mechanisms for data delivery like those underpinning the Internet often prove insufficient.

Network congestion concerns may be particularly serious for narrow, asymmetrical channels such as the out-of-band (OOB) channel of a cable TV network. OOB cable channels are increasingly strained by requirements to handle traffic generated by enhanced TV applications such as those implemented using the Enhanced TV Binary Interchange Format (EBIF) or Open Cable Application Platform (OCAP) standards. Such traffic may include voting and polling data, user preference and statistics traffic, t-commerce information, and other data. Data delivery over DSL and mobile broadband networks faces similar challenges.

To address the problem of network congestion over band-limited networks, various approaches have been described. Some include: packet dropping (via "tail drop" or Active Queue Management), TCP congestion avoidance, Explicit Congestion Notification, window shaping, traffic shaping (i.e., packet delaying), Quality of Service (QoS) schemes, and related bandwidth reservation techniques.

What is needed are systems and methods for regulating network bandwidth to reduce congestion in a way that allow nodes to continue processing while waiting to send and receive data and without requiring long messages, excessive handshaking, or other QoS-type overhead.

SUMMARY OF THE DISCLOSURE

In various exemplary embodiments, systems and methods may be provided for regulating network bandwidth comprising monitoring network traffic, predicting network loads, and scheduling traffic utilizing traffic reporting and bandwidth reservation mechanisms. Traffic reporting may comprise broadcasting control messages to network nodes indicating appropriate times to send and receive messages. Network nodes may use traffic reports (e.g., control messages) to proactively regulate their use of the network. Reservations may be implemented in a synchronous or asynchronous manner. The reservation mechanism may emulate a traditional stream socket API.

In another exemplary embodiment, in addition to the traffic report broadcast, client nodes may make bandwidth reservations before sending or receiving messages or other data.

In some exemplary embodiments, systems and methods may provide bandwidth regulation and lightweight Transmission Control Protocol (TCP) functionality over User Datagram Protocol (UDP) in a digital cable TV out-of-band (OOB) network wherein an Enhanced Television (ETV) Platform Server communicates via Hypertext Transfer Protocol (HTTP) payloads interchanged using UDP with multiple Set-Top Boxes (STBs) running Enhanced TV Binary Interchange Format (EBIF) User Agents.

Other embodiments include networks that utilize TCP and other protocols; networks such as in-band cable TV, DSL, and cellular/mobile networks; and networks based on other architectures and components.

In another exemplary embodiment, bandwidth regulation may be implemented by an EBIF User Agent in a way that may be transparent to EBIF applications. In other embodiments, the traffic schedule may be exposed to network applications, which can then use the disclosed traffic scheduling mechanisms and adjust user-facing behavior appropriately.

In another exemplary embodiment, a bandwidth regulation server may be responsive to external events (e.g., time-of-day or time-of-year bandwidth predictions, breaking news alerts indicating likely traffic storms) to be appropriately managed.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE DISCLOSURE

Figure 1:
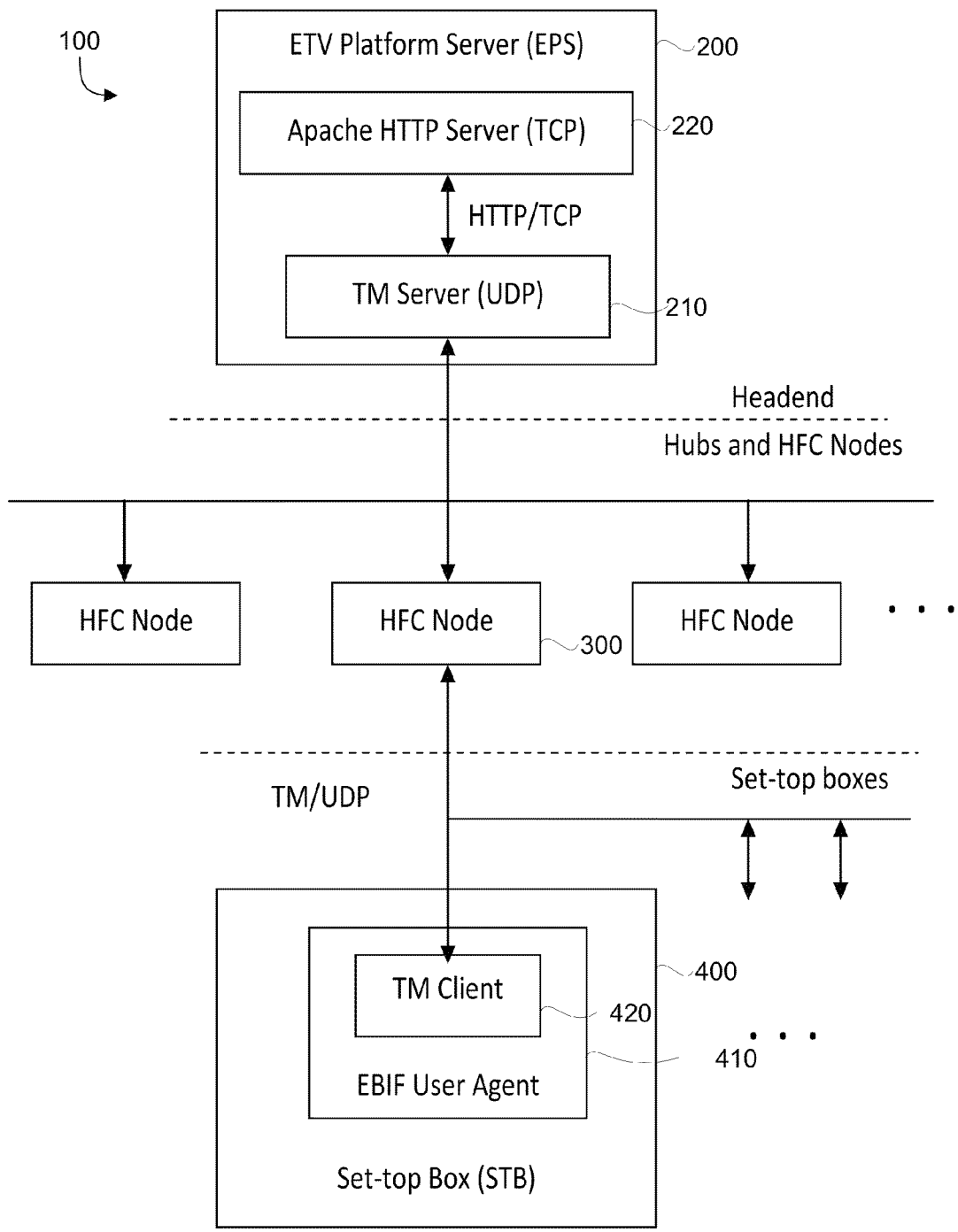
FIG. 1 is an exemplary architecture diagram depicting an embodiment of a system for providing bandwidth regulation in a cable system's out-of-band network.

As illustrated in FIG. 1, the present disclosure relates to network bandwidth regulation using traffic scheduling in the context of Traffic Management (TM) systems 100 and methods. More specifically, an exemplary embodiment is disclosed in the context of a digital cable TV out-of-band (OOB) network wherein an Enhanced Television (ETV) Platform Server 200 communicates via Hypertext Transfer Protocol (HTTP) payloads interchanged using User Datagram Protocol (UDP) with multiple Set-Top Boxes (STBs) 400 running Enhanced TV Binary Interchange Format (EBIF) User Agents 410. In addition to providing bandwidth regulation, the disclosed TM systems 100 and methods may provide lightweight Transmission Control Protocol (TCP) functionality using UDP supporting guaranteed delivery, packet sequencing, flow control, and data compression.

Systems and methods described herein may also be appropriate for use with traffic utilizing TCP and other protocols; for other networks such as in-band cable TV, DSL, and cellular/mobile networks; and for networks based on other architectures and components.

In the present exemplary embodiment, the TM systems 100 and methods take into account the following characteristics of digital cable OOB networks:

Asymmetry—downstream network bandwidth (headend to STB) is greater than upstream;

Low Bandwidth—bandwidth in either direction is measured in Kbps, not Mbps;

High Latency—tunneling Internet Protocol (IP) over a Hybrid Fiber-Coaxial (HFC) network generates delays;

UDP preferred over TCP—saves bandwidth and time, and not all cable OOB networks provide TCP;

HTTP Dominates—most traffic is modeled on HTTP request/response, but there may be exceptions;

Request/Response Dichotomy—most traffic consists of data moving in one direction or the other and the request direction tends to carry much less data;

Fragility—upstream congestion may crash the OOB network and STBs on the network;

Mixed Foreground/Background—Some requests need a timely reply whereas others do not.

Assumptions and Definitions

To facilitate description of the current exemplary embodiment, the following assumptions about the underlying network may be made:

Cable OOB networks use IPv4 exclusively, not IPv6;

IP packet headers occupy 20 bytes;

UDP packet headers occupy 8 bytes;

Media Access Control (MAC) Layer cells have a payload of at least 34 bytes (size varies);

The maximum UDP message size that can fit in one MAC cell, along with 28 bytes of IP and UDP headers, is 34−28=6 bytes. This drives the size of TM packet headers;

The total upstream bandwidth per Hybrid Fiber Coax network node (HFC Node, i.e., demodulator) is 256 Kbps, shared by 500 to 2000 STBs;

Slotted Aloha networks have a theoretical maximum efficiency of 36.8% due to collisions;

The total downstream bandwidth per modulator is 2 Mbps, shared by up to 32,000 STBs;

The performance of the current embodiment may be based on the following numeric constants that may be used in implementations. Representative values are noted, subject to change based upon experimentation and the characteristics of deployed environments:

MTU—Maximum Transmission Unit (i.e., UDP packet size) for TM upstream traffic may be 244 Bytes or 1952 bits. This allows one MTU to fit in exactly 6 MAC cells (272 bytes), including 28 bytes of IP and UDP header. 99% of all upstream messages should fit in 1 MTU. Downstream, the MTU may be larger, up to a maximum of 987 bytes;

SLOT—The time required to send one MTU at 256 Kbps, or 0.008 seconds (8 milliseconds);

SLOTS_PER_SECOND—A constant 125 (i.e., 1000 ms/sec/8 ms/SLOT);

Slot ID—A 6-byte unsigned integer (or larger) that uniquely identifies one SLOT (i.e., 8 millisecond time slice) since Jan. 1, 2000 at 00:00:00. That is, a Slot ID of 0 refers to the 8 millisecond time slice starting at Jan. 1, 2000 at 00:00:00.000, and ending at Jan. 1, 2000 at 00:00:00.008; Slot ID 2 refers to the next time slice, beginning at Jan. 1, 2000 at 00:00:00.008 and ending at Jan. 1, 2000 at 00:00:00.016, and so on. For example, the Slot ID of the 34th SLOT for the date-time of May 8, 2010 3:21:04 AM is 40825508034. The Slot ID of the first SLOT representing the 100 year anniversary second of this date is 242007908000;

VPORT—The actual port number (1962) used for all TM traffic. This number has been registered to BIAP, Inc.;

VSEND_WASTE—The maximum number of milliseconds between packets that a data sending function (e.g., vsend( )) should continue to block. Initially set to 100 milliseconds;

VSEND_TRIES—The maximum number of packet resends that vsend( ) should attempt before returning. Initially set to 5.

VRECV_WASTE—The maximum number of milliseconds that a data receiving function (e.g., vrecv( )) should continue to block waiting for a data packet. Initially set to 100 milliseconds.

Traffic Management Architecture

FIG. 1 is an exemplary architecture diagram depicting an embodiment of a system 100 for providing bandwidth regulation in a cable system's OOB network. The depicted TM Client 420 and TM Server 210 components may provide TCP-like functionality over UDP with built-in bandwidth regulation.

The embodiment may consist of one or more ETV Platform Servers (EPS) 200 located at a cable operator headend communicating with multiple STBs 400 located at customer premises connected through a plurality of Hubs (not shown) and HFC Nodes 300 in a tree and branch topology. The EPS 200 may comprise a TM Server 210 which may be a high-performance UDP proxy server that relays incoming TM/UDP traffic consisting of HTTP payloads to an Apache HTTP Server 220 via HTTP/TCP and then relays HTTP/TCP responses back to the originating STB 400 via TM/UDP through the intermediate HFC Nodes 300 and Hubs.

STBs (i.e., client nodes) 400 may comprise an EBIF User Agent 410 utilizing a TM Client 420 to support the data networking needs of EBIF applications (not shown) running on the STBs 400. The TM Client component 420 may be a static library that mimics a standard stream socket Application Programming Interface (API) for TCP networking, providing for multiple simultaneous "virtual" stream sockets and connections while using only a single actual datagram socket/port.

The indicated TM/UDP protocol may use a simple packet fragmentation, sequencing, and acknowledgement scheme to guarantee message delivery. Bandwidth regulation may be controlled by the TM Server 210 which may monitor upstream traffic to predict network loading, and broadcast control messages to STBs 400 that tell TM Clients 420 how to schedule upstream messages (e.g., via bandwidth reservations). Downstream bandwidth regulation may be accomplished entirely within the TM Server 210.

Given the architecture depicted in FIG. 1, there may be three operational modes supported, only one of which may be used for any particular cable operator. Which mode is supported may depend on: (a) the availability of a continuous trickle of downstream bandwidth for UDP broadcast of load information to STBs 400, and (b) permanent allocation of one socket/port on the client system. These modes may be:

Mode 1—When both (a) and (b) are available, the TM Server 210 may broadcast info packets (see below) to all STBs 400 periodically, e.g., every 10 seconds and more often during heavy load conditions. This should require about 30 bps (0.03 Kbps);

Mode 2—When (a) is available, but not (b), and the TM Client 420 must wait for an info packet before sending any message, these packets must be sent more frequently. This should require about 270 bps (0.27 Kbps);

Mode 3—When (a) is not available, probe packets (described below) must be used to "test the waters" before sending every message. This may cause brief bandwidth spikes beyond the configured limits, and is therefore less desirable than the other modes.

Traffic Management Server

Figure 2:
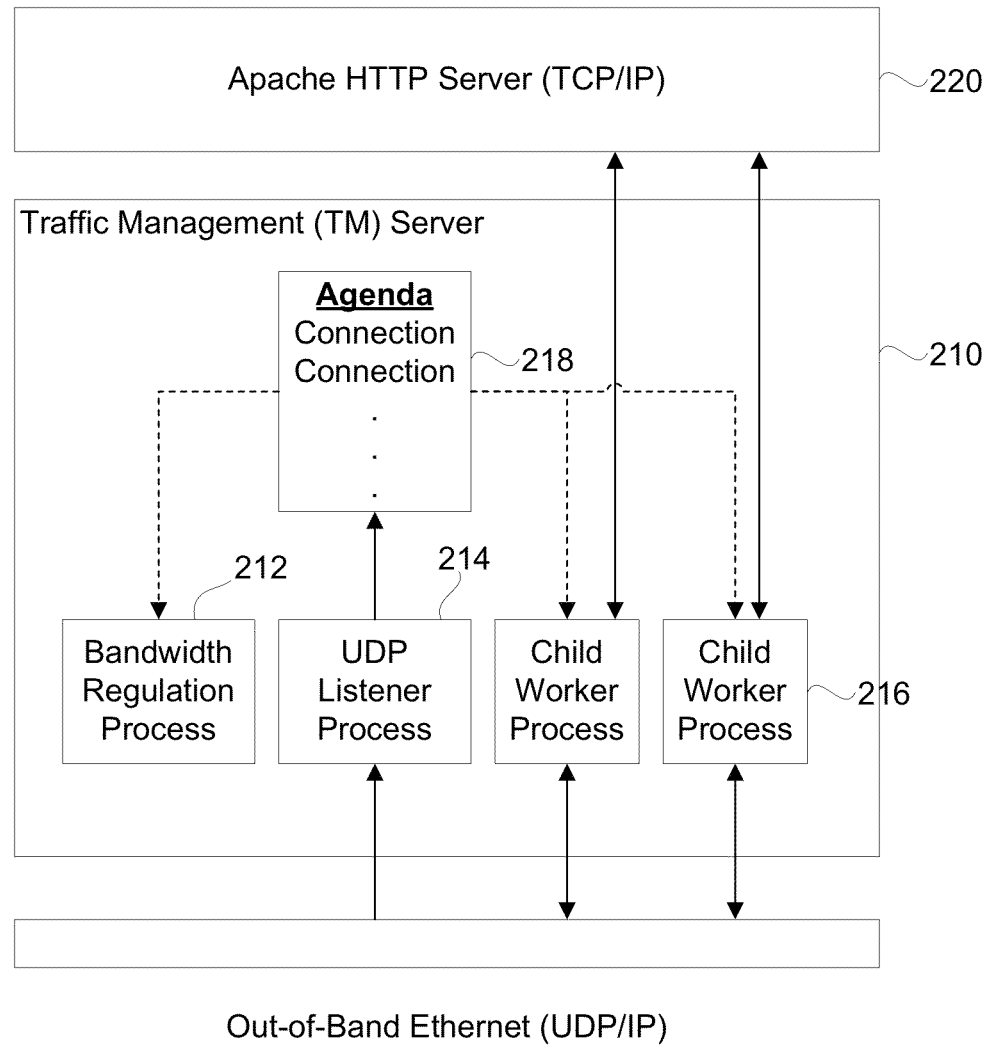
FIG. 2 is an exemplary architecture diagram depicting an embodiment of a Traffic Management Server according to an exemplary embodiment of the present invention.

FIG. 2 is an exemplary architecture diagram depicting an exemplary embodiment of a Traffic Management (TM) Server 210.

The TM Server 210 may be a high-performance UDP to TCP relay server that implements the TM guaranteed delivery protocol and OOB bandwidth regulation. Incoming connections and data may be received via a UDP Listener process 214 and the connection/packet may be placed as a task on an agenda 218. As depicted by the dashed lines in FIG. 2, the agenda 218 may be read by several processes.

A connection may be implicitly "opened" whenever a data or probe packet arrives with a new combination of IP address, Port, and ConnID (see Packet Formats section below) header fields. Child processes 216, which may each implement multiple worker threads, may process these packets as they arrive, reassembling them in the proper order into the original messages, and returning ACK packets to the client as necessary. Completed messages may then be sent to the Apache HTTP Server 220 via a standard HTTP/TCP/IP connection. The HTTP response from Apache may then be returned to the corresponding client via the "open" virtual connection (i.e., via downstream data packets).

The bandwidth regulation process 212 may monitor incoming packets in real time. This information and its rate of change may be used to estimate loading trends. From this estimate, a corresponding Send Probability may be computed. This Send Probability and clock synchronization information may be periodically broadcast via UDP to all TM Clients 420.

Traffic Reporting

This section describes an exemplary method for communicating load information to TM Clients 420.

The TM Server 210 and TM Clients 420 may manage upstream OOB bandwidth by spreading out the time used to send messages. Every message may be broken down into fixed-sized data packets and each packet may be bounded by a random delay. For example, if the current global send probability (i.e., variable send_probability) is 32767, the delay (in SLOTs) may be calculated to be:

tm_random( ) % (131072.0/32768+0.5)=tm_random( ) % 4 which results in a value between 0 and 3. For example, if tm_random( ) returns 446, then 446% 4=2. A call to a channel/slot reservation function on a TM Client 420 would return the reservation delay of 16 milliseconds to the caller (i.e., 8*2, where each SLOT is 8 milliseconds). This information may also be used to update a reservation_slot variable with the delay of 2 to the current Slot ID value. This is interpreted to mean that the first virtual connection in a reservation queue maintained by the TM Client 420 has a packet to send in 16 milliseconds (i.e., 2 SLOTs) from now. At that time, a subsequent call to the reservation function will see that the reserved time has arrived and return a 0 to the caller, who will then send the message. A send_probability value may be set as follows:

(1) It is initialized to a default value of 16,387.

(2) In Modes 1 and 2, its value is received directly from info packets broadcast by the TM Server 210. This value supersedes any older send_probability value. In Mode 3, a probe packet is sent as soon as possible to generate a corresponding ACK packet.

(3) Every ACK packet contains an update of the send_probability value. This value supersedes any older send_probability value.

(4) Every time a sent packet acknowledgement times out (i.e., the packet is not acknowledged), the send_probability value is halved (minimum of 1). Every second which passes without a send_probability being halved in this way, send_probability is caused to be increased by 100, to a maximum value of 16,387.

As described above, Mode 1 generates a broadcast stream of info packets requiring about 0.03 Kbps of downstream bandwidth. Mode 2 requires 0.27 Kbps. Depending on the mode, the client should start listening for info packets as soon as possible after a true socket is available.

Random Number Generation

This section presents an exemplary implementation of a random number generator (i.e., tm_random( ) and tm_randomize( )) suitable for calculating message delays and other needs of various exemplary embodiments of the present invention:

```
static uint32 tm_seed = 19610508;
uint32 tm_random( ) {
    const uint32 a = 16807;
    const uint32 m = 2147483647;
    const uint32 q = 127773;       /* m / a */
    const uint32 r = 2836;         /* m % a */
    int32 lo, hi, test;
    hi = tm_seed / q;
    lo = tm_seed % q;
    test = a * lo - r * hi;
    if (test > 0)
        tm_seed = test;
    else
        tm_seed = test + m;
    return tm_seed;
}
void tm_randomize(uint32 s) {
    tm_seed = s;
}
``` tm_randomize(<ip_address>) should be called exactly once on startup, where <ip_address> is the uint32 (4-byte) value of the IPv4 address of the STB.

Client Clock Synchronization

This section describes an exemplary method of client clock synchronization suitable for various exemplary embodiments of the present invention.

Info packets broadcast from the TM Server 210 may contain timing synchronization information along with send_probability updates. The timing information may come in two fields of the info packet:

SynchSecond (1-byte)—A value in the range 0 . . . 119 identifying which second the packet was sent according to the server clock. The value is an offset from the start of the most recent even-numbered minute.

SynchPhase (1-byte)—The number of SLOTs (0 . . . 124) that elapsed in the synchronizing second before sending this packet.

For example, if the time at which an info packet is constructed on the TM Server 210 is 13:23:43.728 GMT, including fractions of a second, the value assigned to the SynchSecond field would be 103. Since the minute value, 23, is odd, the most recent even-numbered minute is 22. The offset from 13:22:00 to 13:23:43 is 01:43, or 103 seconds.

Once the second has been identified, the remaining 0.728 seconds (728 milliseconds) must be accounted for. Assuming one SLOT occupies 0.008 seconds (8 milliseconds), the number of slots is calculated as 728/8=91. This value (e.g., 91) is assigned to the SynchPhase field in the info packet.

Every time the TM Client 420 receives an info packet, it may perform the following steps to update a time_offset_msec variable:

(1) Calculate the current date/time (GMT) as seconds since some epoch in floating point variable current_time.

(2) Calculate the time defined by the two fields found in the info packet (GMT) as seconds since the same epoch, in floating point variable synch_time.

(3) Calculate the floating point variable synch_offset_msec=(synch_time=current_time)*1000, the latest offset in milliseconds.

(4) Set time_offset_msec=time_offset_msec*0.9+synch_offset_msec*0.1. This generates a slow moving average of the time offset as conditions change over time. Prior to receiving any info packets, initialize time_offset_msec to zero (0).

In Mode 1, it may not be necessary to update time_offset_msec with every info packet. One update per minute may be sufficient. In Mode 2, this time offset may preferably be calculated for every info packet.

Whenever the "current time" is referenced, it may be assumed to be the current time of the STB (GMT) plus the time_offset_msec value scaled to the appropriate time units (i.e., time_offset_msec*1000, if "current time" is reported in seconds).

Traffic Management Client

Figure 3:
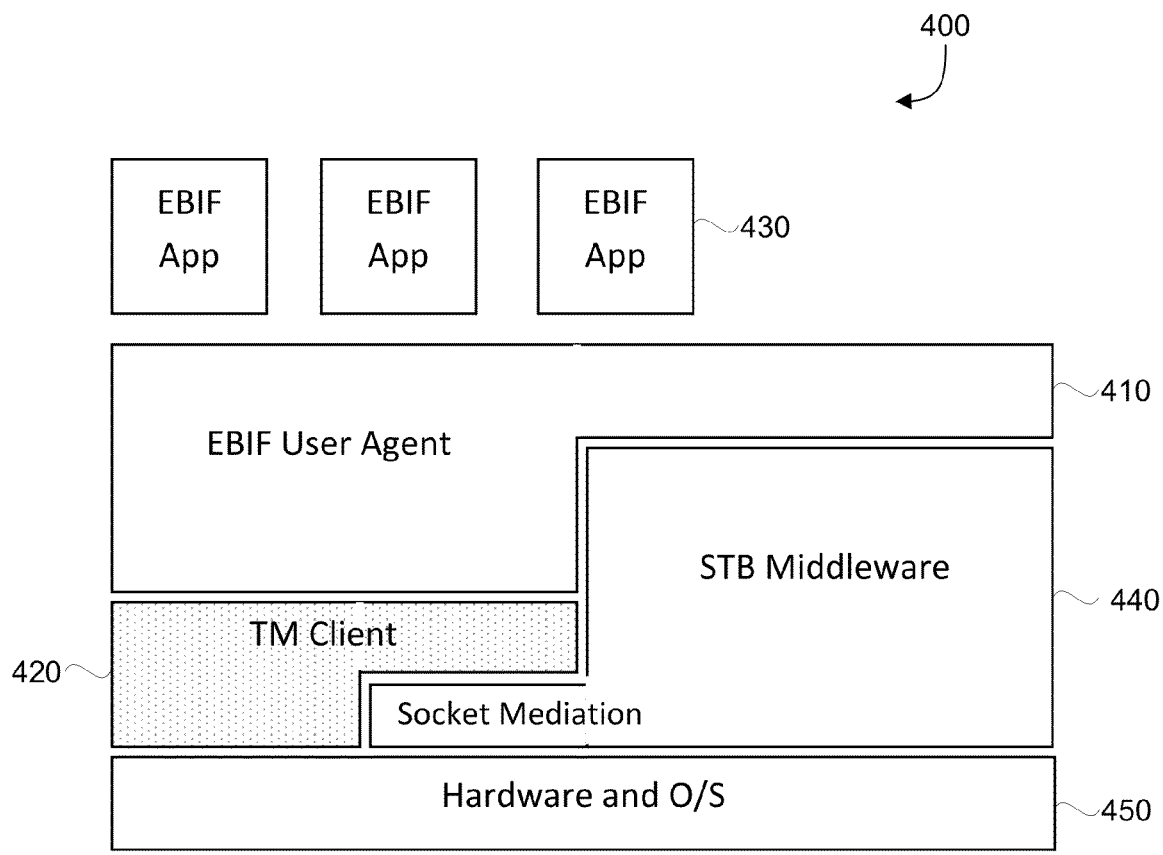
FIG. 3 is an exemplary architecture diagram depicting a programmer's view of an embodiment of a Traffic Management Client according to an exemplary embodiment of the present invention.

FIG. 3 is an exemplary architecture diagram depicting a programmer's view of an embodiment of a Traffic Management Client 420 according to an exemplary embodiment of the present invention. It shows how a TM Client 420 may be utilized by an EBIF User Agent 410 to provide traffic management services for multiple EBIF Apps 430 by utilizing Socket Mediation capabilities of STB Middleware 440 along with other capabilities of the Hardware and Operating System (O/S) 450 provided by the client device (e.g., STB) 400. As will be further described, the TM Client 420 may utilize standard STREAM socket APIs, provide both synchronous and asynchronous modes for bandwidth regulation using traffic scheduling, allow both client and server connections, support multiple "virtual" sockets/ports, provide guaranteed delivery, provide data compression, and impose no a priori bandwidth restrictions.

Network APIs

Figure 4A:
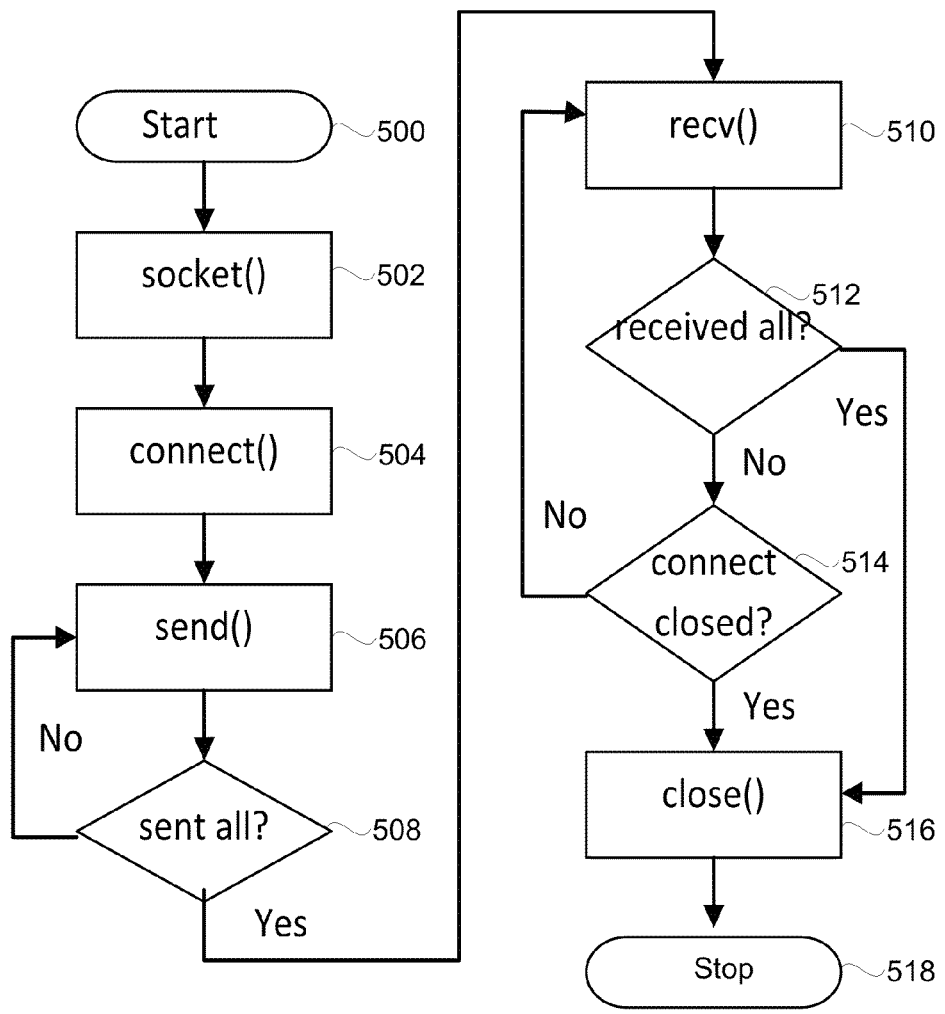
FIG. 4a is a flowchart depicting a prior art TCP/STREAM socket implementation of HTTP.

FIG. 4a is an exemplary flowchart depicting a prior art TCP/STREAM socket implementation of HTTP that may be used by a networking client. Upon starting (step 500), socket( ) may be called to obtain a new socket id (step 502). Next, a connection with a server defined by an IP address and port number may be obtained by calling connect( ) (step 504). The request string may then be sent to the server by means of a send( ) function (step 506), possibly requiring multiple calls to send( ) to process the entire request (step 508). After all the data has been sent (i.e., sent all?=Yes (step 508)), a call may be made to recv( ) to wait for a response (step 510). As with send( ) (steps 506, 508), multiple calls to recv( ) may be required to retrieve the entire HTTP response (i.e., iterate until received all?=Yes) (step 512). Finally, close( ) may be called to close the connection (step 516), after which the process stops (step 518). Additionally, it may occur that the entire HTTP response is not received, but the connection is closed (step 514). In this instance, close( ) may be called (step 516) to stop the process (step 518). Implementing this type of synchronous HTTP client will be known by a person of ordinary skill in the art.

Figure 4B:
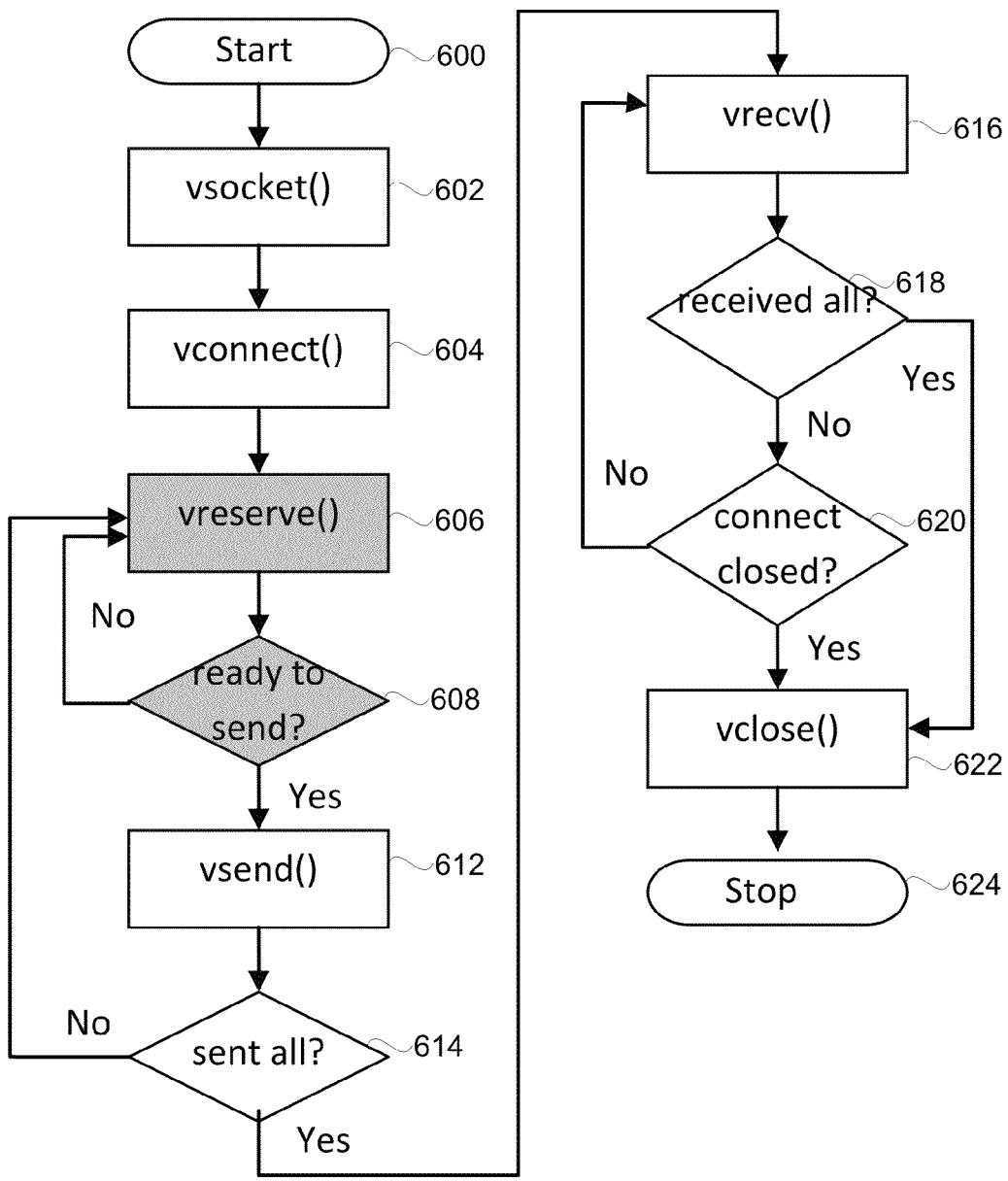
FIG. 4b is a flowchart depicting a synchronous (blocking) virtual socket implementation of HTTP according to an exemplary embodiment of the present invention.
Figure 4C:
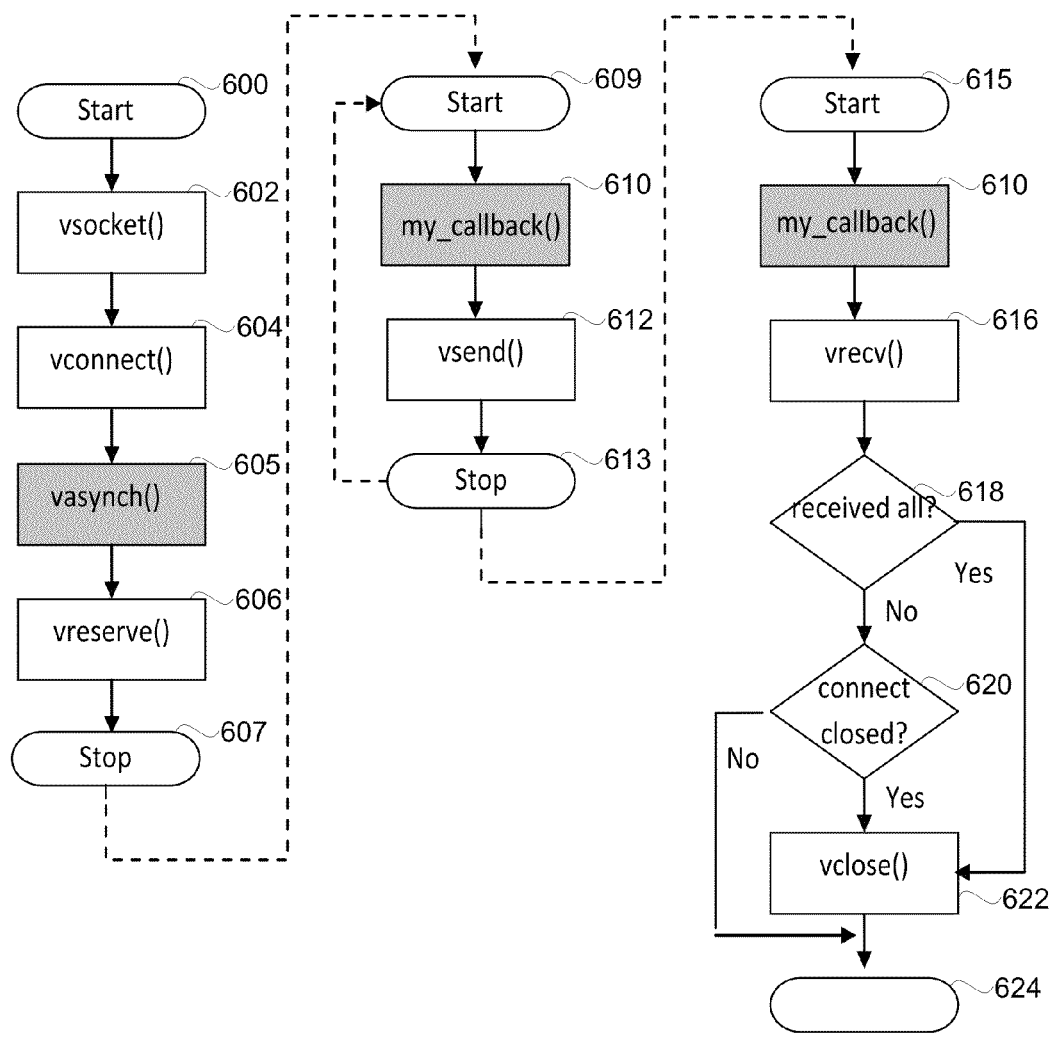
FIG. 4c is a flowchart depicting an asynchronous (non-blocking) virtual socket implementation of HTTP according to an exemplary embodiment of the present invention.

FIGS. 4b and 4c depict exemplary embodiments of virtual socket implementations of HTTP according to an exemplary embodiment of the present invention. The flowchart in FIG. 4b depicts a synchronous (blocking) version. The flowchart in FIG. 4c depicts an asynchronous (non-blocking) version.

As shown in these figures, standard stream socket API calls may have virtual equivalents (e.g., send( ) 506 becomes vsend( ) 612 enabling programmers to use stream sockets in a familiar way. A small number of additional functions may exist as indicated by the shaded blocks. According to various exemplary embodiments of the present invention, all upstream traffic may preferably be scheduled based on the current load conditions of the network. When the network load is low, data may be sent quickly, if not immediately. When network load is higher, there may be delays. The TM Client 420 can estimate the expected delay from the return value of vreserve( ) 606 and decide how to proceed, or not proceed, and use the intervening cycles for other tasks.

The indicated API calls may be provided via a static library and prototyped in a C header file (.h). Such a header file may #define macros that map the traditional stream socket APIs to their Traffic Management analogues. Such macros would allow existing socket code to work with Traffic Management systems and methods, requiring only minor changes for scheduling of send calls and asynchronous processing.

The following paragraphs provide detail of the virtual calls depicted in FIGS. 4b and 4c in the context of the disclosed steps. For every API call described, parameter and return types would typically reference the same types used in the traditional socket APIs, thus they are not described here. Names beginning with the letter "v" are specific to the systems and methods described herein. It is assumed that the standard (i.e., non-TM) socket APIs are also available, such as htonl( ), ntohl, getaddrinfo( ), etc. Other traditional socket APIs may not have analogs when using Traffic Management, such as poll( ), select( ), and shutdown( ).

FIG. 4b is an exemplary flowchart depicting a synchronous (blocking) virtual socket implementation of HTTP according to an exemplary embodiment of the present invention.

After the process starts (step 600), the first call may be vsocket( ) to allocate a virtual socket descriptor (step 602). The descriptor returned by this function may be used for subsequent calls to vlisten( ), vbind( ), vsend( ), and other functions. Implementation in a TM Client 420 may include allocating a new empty virtual socket structure in a virtual socket table and returning a table index of that entry as a virtual socket descriptor. In Mode 2, this call may also cause the opening and initialization of tm_socket so it can begin to listen for info packets.

In the next step, the requesting node may call vconnect( ) (step 604) to connect a virtual socket to a TM Server 210. Relevant parameters to pass to vconnect( ) 604 may include the virtual socket descriptor and the IP address and port number of the server to connect to. If the calling program wishes to specify what local port is used for the connection, a call to vbind( ) may be made (not depicted in FIG. 4*b*). vbind( ) may associate a specified virtual socket descriptor with the local IP address and an explicit local port number. The virtual socket's port number may be stored in a virtual socket structure table entry indexed by the virtual socket descriptor. If vbind( ) has not been previously called on the socket descriptor, the indicated socket descriptor may be automatically bound to the local node's IP address and a random local port. This should be acceptable if the calling node is not a server, since the node likely does not care which local port is used. Once the virtual socket is connected, vsend( ) and vrecv( ) can be called as needed to send and receive data. The server's host IP address and port may be stored in a virtual socket table for a virtual socket structure indexed by sockfd.

Next, a call to vreserve( ) (step 606) may be made to make a reservation to send data upstream. vreserve( ) 606 may accept a virtual socket descriptor (vsockfd) and return the number of milliseconds to wait before sending a message (using vsend( )). When vreserve( ) 606 returns zero (i.e., ready to send?=Yes (step 608)), the message can be sent with minimal probability of being blocked. While waiting for a reserved slot, the calling program may perform other tasks. vreserve( ) 606 may be called periodically to check on reservation status.

In the next step, vsend( ) may be used to send a message to the server previously connected via the virtual socket returned by the vsocket( ) call (step 612). vsend( ) 612 may accept parameters as input indicating the connected virtual socket descriptor (vsock), a pointer to a buffer contain the data to be sent (buf), and the number of bytes to send (len). It may return the number of bytes actually sent. Similar to the traditional send( ) call depicted in FIG. 4*a* (step 506), vsend( ) is a synchronous (i.e., blocking) call, and may return before all data has been sent (i.e., sent all?=No (step 614)). Thus, vsend( ) may be called repeatedly in conjunction with additional calls to vreserve( ) (steps 612 and 614). For large messages, or when the network is heavily loaded, this will likely be the case.

If vsend( ) 612 is called and no reservation is found for the specified virtual socket, vsend( ) 612 may call vreserve( ) 606 internally, and block (i.e., sleep) until the reservation arrives, and then begin sending. If vsend( ) 612 is called without a reservation, or before vreserve( ) 606 returns zero, vsend( ) 606 may block until it can send data. In such cases, the intervening time, possibly several seconds, will be wasted.

Upstream message scheduling may occur on the first call to vreserve( ) 606 for a given message, or on a call to vsend( ) 612 when no reservation has been made for the virtual socket in question. The vsend( ) 612 API may not actually send data for a virtual socket until: (a) a reservation exists in a reservation table for that virtual socket, and (b) the Slot ID in reservation_slot matches the current Slot ID. The message scheduling process may function as follows.

Assuming a call is made to vreserve (vsocket_descriptor):

(1) Calculate the Slot ID of the current time, where current_slot_id=#_of_whole_seconds_since$_{01/01/00\_}$00:00:00*125+fraction_of_current_second/0.008.

(2) If vsocket_descriptor is found at position X in a reservation queue, set queue_pos=X, and skip to step 5. Otherwise, set queue_pos=size_of_reservation_queue+1.

(3) If queue_pos==1 (i.e., the queue is empty), set reservation_slot=current_slot_id+(tm_random( ) % (131072.0/send_probability+0.5).

(4) Add vsocket_descriptor to the reservation queue.

(5) Return (8*(reservation_slot−current_slot_id)*queue_pos) as the result of vreserve( ).

Referring back to FIG. 4*b*, after all data has been sent using vsend( ) (i.e., sent all?=Yes (step 614)), a call may be made to vrecv( ) to receive a message from a server via a previously connected virtual socket (step 616). The vrecv( ) call (step 616) may accept input parameters indicating the connected virtual socket descriptor (vsock), a pointer to a receive data buffer (but), and the size of the receive data buffer in bytes (len). It may return the number of bytes actually received or zero (0) if the virtual connection to the server closes for any reason. Since the number of bytes actually received may be less than the size of the buffer, vrecv( ) 616 may be called repeatedly until the entire message has been received (i.e., received all?=Yes (step 618)). If all the data has not been received (i.e., received all?=No (step 618)) and the connection with the server was not closed (i.e., connect closed?=No (steo 620)), vrecv( ) may be called again (step 616).

The implementation of vrecv( ) 616 may be similar to vsend( ) 612, except that in the vrecv( ) 616 case the TM Client 420 must generate the appropriate ACK packets and send them back to the TM Server 210. Also, because vrecv( ) 616 can operate asynchronously, it should return to the caller after VRECV_WASTE milliseconds have elapsed without receiving a data packet from the TM Server 210, or when the provided receive buffer has been filled.

Returning to FIG. 4*b*, if all the data has been received (i.e., received all?=Yes (step 618)) or it is determined that the server connection was closed (i.e., connect closed?=Yes (step 620)), the client node may call vclose( ) to close the virtual socket (step 622) and the process stops (step 624). Since there may be a small number of available virtual sockets, it is important to close them when not needed. Implementation of vclose( ) 622 may entail freeing a Virtual Socket structure in a Virtual Socket Table indexed by vsockfd.

The synchronous (blocking) HTTP transaction depicted in FIG. 4*b* may be sufficient for many applications that do not need to do additional processing while waiting for a response to be received. But for applications which must perform other tasks while waiting for data, an asynchronous (non-blocking) callback mechanism may be implemented as depicted in FIG. 4*c*. This asynchronous mechanism may be different from the known select API, but may be much simpler to use and to implement.

Referring now to FIG. 4*c*, the initial steps are identical to those in FIG. 4*b*. Upon starting the process (step 600), vsocket( ) is called to allocate a virtual socket descriptor (step 602). Then vconnect( ) is called (step 604) to connect a virtual socket to a TM Server 210.

Next, vasynch( ) is called to associate a virtual socket with an asynchronous callback function (step 605). This function may accept a virtual socket descriptor (vsockfd) acquired via vsocket( ) and a reference to a callback function that references vsockfd, a message code (msg), and any activity-specific information (data). All future activity on the virtual socket (e.g., errors, reservations, received data, etc.) will invoke the callback function and specify an appropriate msg code identifying the activity. Msg codes may be:

VAERROR—Check verrno for the actual error code.

VARESOPEN—A reservation opened via vreserve( ) is now open. Send data via vsend( ).

VAGOTDATA—Data has been received for this virtual socket. Call vrecv( ) to get it.

VAGOTCONN—A new connection has arrived on this virtual socket. Call accept( ) to get it.

Implementation of vasynch( ) 605 may entail storing the virtual socket's callback function in the virtual socket structure table entry indexed by the virtual socket descriptor. If a connection has been established, and a message sent upstream, ConnID in the packet header may be used to identify the receiving virtual socket. For alert messages, the header space for ConnID and SeqNum may be co-opted by the TM Server 210 and used to store a port number. This port may be used to identify the bound socket to receive the alert (see the Packet Formats section below for more information about ConnID, SeqNum, and packet headers).

Continuing with FIG. 4*c*, after vasynch( ) is called (step 605), a call to vreserve( ) may be made to make a traffic reservation on the indicated socket (step 606), and the process stops (step 607).

As shown in FIG. 4*c*, the sending and receiving processes are asynchronous, relying on a callback function (i.e., my_callback( )) to start each process. The dotted arrows in the figure denote periods of time when other tasks may be performed between callback activations. Specifically, the process of sending data starts (step 609) with a callback function indicated by my_callback( ) (step 610), followed by a call to vsend( ) (step 612), and then the process stops (step 613). The process for receiving data is similar. It starts (step 615) with a callback function (i.e., my_callback( ) 610) followed by the same data receiving steps described in FIG. 4*b*. vrecv( ) may be called (step 616) until all data is received (step 618) or the server connection is closed (step 620), then a call to vclose( ) (step 622) may be made and processing stops (step 624).

Two additional functions not depicted in FIG. 4*b* or 4*c* that may be useful include vlisten( ) and accept( ). The vlisten( ) call may be used by a node needing to act as a server to listen for incoming connections on an indicated (i.e., passed in) bound virtual socket (vsockfd). Such functionality may be appropriate for nodes waiting for a connection from an application server (e.g., for alert messages). Before calling vlisten( ) calls to vsocket( ) and vbind( ) should be made to allocate the virtual socket and define the port to listen on (respectively). Because synchronous listening may make no sense in many applications (e.g., STBs in an OOB cable network), a call to async( ) may be needed to make the virtual socket asynchronous. The vlisten( ) call will return immediately, and the asynchronous callback function will be invoked with a VGOTCONN message when a connection arrives. A vaccept( ) call may be defined and used to accept such new connections. Any asynchronous virtual socket bound to a port via vbind( ) will receive VGOTCONN messages when a connection arrives. The vaccept( ) call may accept the connection and return a new synchronous virtual socket descriptor that can be used for sending and receiving data. The original listening socket descriptor, vsockfd, may remain unchanged, and still listening. The virtual socket descriptor returned by vaccept( ) may be closed using vclose( ) when no longer needed.

In another exemplary embodiment of a virtual socket implementation of HTTP according to an exemplary embodiment of the present invention, the reservation functions provided by vreserve( ) 606 may be included in vsend( ) 612 and vrecv( ) 616, and a vreserve( ) 606 call not provided. In this embodiment, in addition to vsend( ) 612 and vrecv( ) 616 returning the number of bytes sent or received (respectively), each call would transparently make a bandwidth reservation and return a negative number representing the number of milliseconds until a send or receive slot is available in cases when data cannot be immediately sent or received. This may be advantageous for use in blocking implementations of vrecv( ) 616 by allowing additional processing to occur on a client node while waiting to receive data in a way similar to that shown in the vreserve( ) 606-vsend( ) 612 loop depicted in FIG. 4*b*. It may also simplify the API by eliminating one non-standard call (vreserve( ) 606).

Packet Formats

To manage multiple kinds of traffic on a single pipe, an exemplary embodiment of the present invention may define four distinct message packet types as specified below in relation to FIGS. 5*a*-5*d*. These may comprise the TM/UDP protocol indicated in FIG. 1.

Info Packet

Figure 5A:
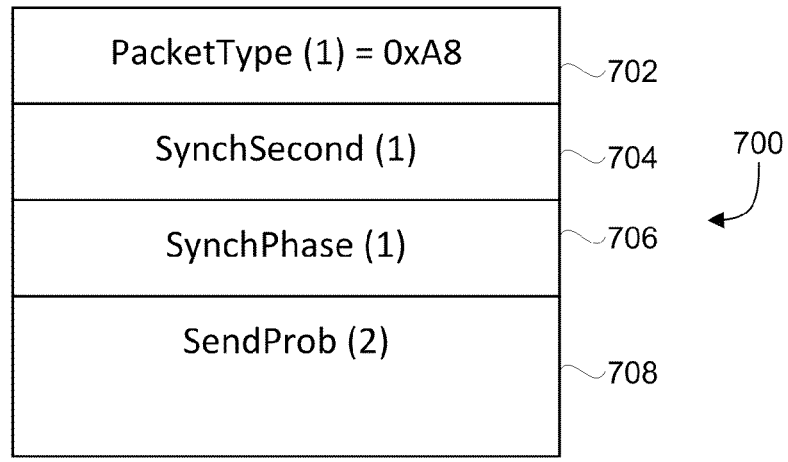
FIG. 5a is a graphical representation of an exemplary Info Packet.

FIG. 5*a* is a graphical depiction of an exemplary Info packet 700. The TM Server 210 may broadcast these small UDP messages to all STBs 400 simultaneously to communicate information about system load conditions and timing synchronization. Info packets 700 may comprise:

PacketType 702 (1-byte)—A constant that identifies a valid TM packet, and may specify which of the four types it is. All TM PacketType values 702 may contain the high order 6 bits 0xA8, which can be used as a filter mask. The low order 2 bits vary by packet type. For Info packets 700, these bits are 0x00 making the value for Info packet 700 PacketType 0xA8 & 0x00=0xA8.

SynchSecond 704 (1-byte)—A value in the range 0 . . . 119 identifying which second the packet was sent according to the server clock. The value may be an offset from the start of the most recent even-numbered minute.

SynchPhase 706 (1-byte)—The number of SLOTs (0 . . . 124) that elapsed in the synchronizing second before sending this packet.

SendProb 708 (2-bytes)—A 16 bit number that may be used to calculate the random delay imposed on every outgoing packet.

Data Packet

Figure 5B:
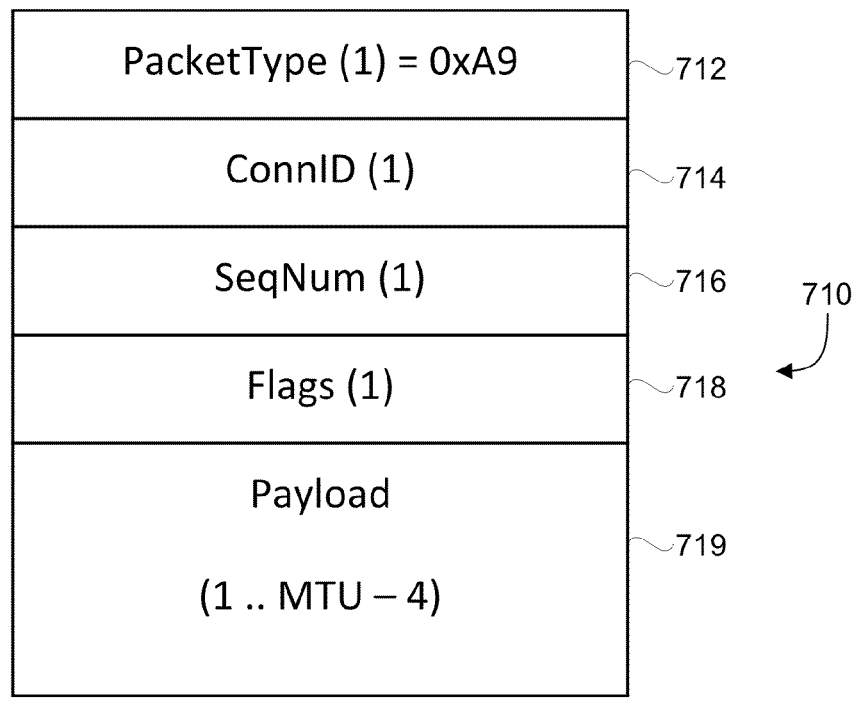
FIG. 5b is a graphical representation of an exemplary Data Packet.

FIG. 5*b* is a graphical depiction of an exemplary Data packet 710. Data sent upstream may be broken into such MTU-size packets, each small enough to be transmitted within a single SLOT. Downstream data may use the same packet format, but the downstream MTU size may be larger. Data packets may comprise:

PacketType 712 (1-byte)—A constant that identifies a valid TM packet, and may specify which of the four types it is. For Data packets 710 the PacketType value 712 is 0xA9.

ConnID 714 (1-byte)—A unique connection ID corresponding to a virtual socket associated with every virtual connection.

SeqNum 716 (1-byte)—The value of this field may depend on the position of the packet in the message (see the Flags field), as follows:

(1) IF this is the first packet in the message AND the number of packets is >1, this value is the total number of packets in the message (1 . . . 256), minus 1 (this means the maximum upstream message size is 256*(MTU−4), or 61,440 bytes).

(2) ELSE IF this is the last packet in the message, this value defines the size of this packet's payload (1 . . . MTU−4), minus 1 (this means the receive does not know the actual message size until receiving the last packet, but an estimate based on packet count wastes at most MTU×5 bytes, or 0.39%).

(3) ELSE, this value is the sequence number of the packet, minus 1.

Flags 718 (1 byte)—A bit vector containing the following bit flags:

FirstPacket—Set (e.g., =1) if this is the first packet in the message.

LastPacket—Set (e.g., =1) if this is the last packet in the message.

Resend—Set (e.g., =1) if this is not the first time this packet is sent.

Alert—Set (e.g., =1) if this is an "alert" message originating on the server side.

The remaining 4 flag bits may be reserved for future use.

For server originating messages (i.e., alerts), an IP address may be used to identify a STB 400. The header space for ConnID 614 and SeqNum 616 are combined to provide 2 bytes where the TM Server 210 may store a port number. The port is then used to identify which virtual connection receives the alert, based on port binding. Alert messages are identified via the Alert bit in the Flags field 618. The entire alert message must fit within (downstream MTU−5) bytes.

Regarding the "minus 1" in the definitions of SeqNum 616, an exemplary message always consists of between 1 and 256 packets, but one byte represents integers between 0 and 255. So the SeqNum value 616 is always one less than the value it represents.

ACK Packet

Figure 5C:
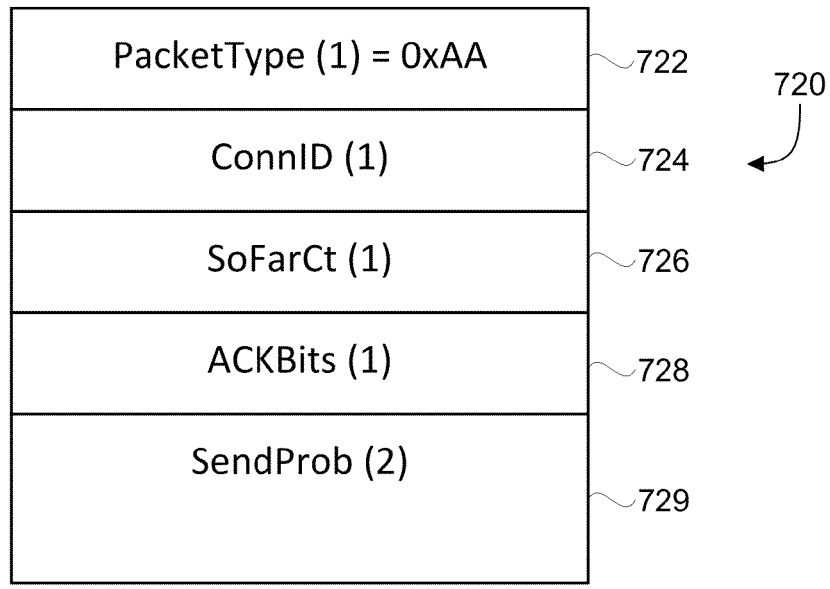
FIG. 5c is a graphical representation of an exemplary ACK Packet.

FIG. 5c is a graphical depiction of an exemplary ACK packet 720. Reception of a data packet 710 may be acknowledged by sending back one of these packets. ACK packets 720 may comprise:

PacketType 722 (1-byte)—A constant that identifies a valid TM packet, and may specify which of the four types it is. For ACK packets 720 the PacketType value 722 is 0xAA.

ConnID 724 (1-byte)—The ConnID value 714 from the received data packet 710.

SoFarCt 726 (1-byte)—The number of packets of the message received so far before the first missing packet.

ACKBits 728 (1-byte)—Acknowledgement of up to 8 packets after packet # SoFarCt. As with all transmitted data, it may be in network byte order, with the first packet after SoFarCt acknowledged by the high-order bit, and the 8th packet after SoFarCt acknowledged by the low-order bit.

SendProb 729 (2-bytes)—A 16 bit number used to calculate the random delay imposed on every outgoing packet.

Probe Packet

Figure 5D:
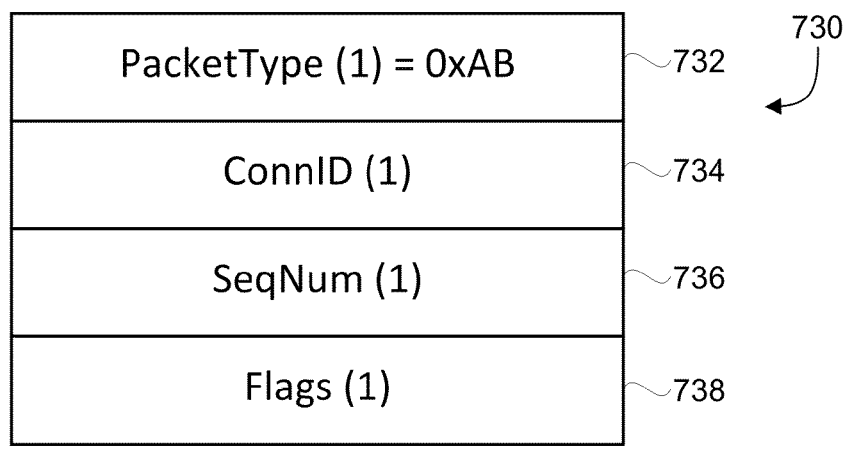
FIG. 5d is a graphical representation of an exemplary Probe Packet.

FIG. 5d is a graphical depiction of an exemplary Probe packet 730. Ordinarily, all data packets 710 in a message, except the last packet, must contain the maximum size payload (MTU−6). This facilitates estimating packet size. However, when load information is unavailable, the first packet of the message may need to be sent as a probe, to get load information in the corresponding ACK. Probe packets 730 may preferably be small, and fit within one MAC cell payload (34 bytes). Hence, probe packets 730 contain the same 6 bytes of header information as the first data packet of a message (with PacketType=0xAB) 732, but without the payload. The SeqNum value 736 counts only the subsequent 1 to 256 data packets, and does not count the probe as a packet in any buffer length calculations (refer to the TM Server section for a description of further use of the probe data in predicting network load).

TM Client Data

Figure 6A:
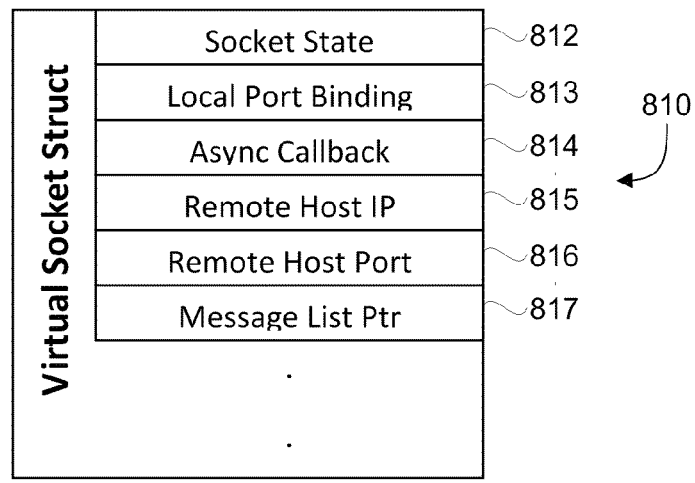
FIG. 6a is graphical representation of a virtual socket structure.
Figure 6B:
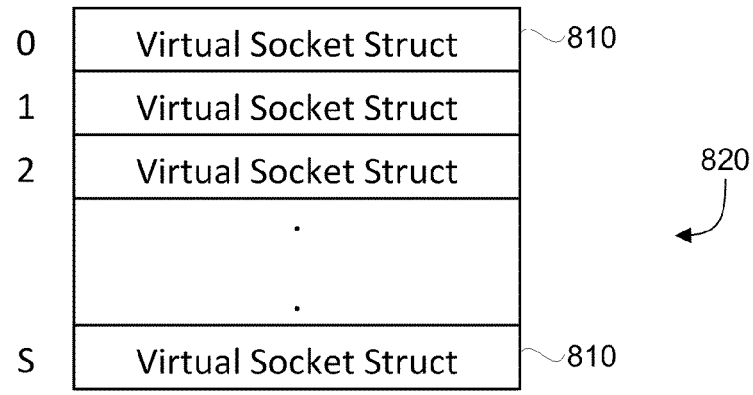
FIG. 6b is graphical representation of a virtual socket table structure.
Figure 6C:
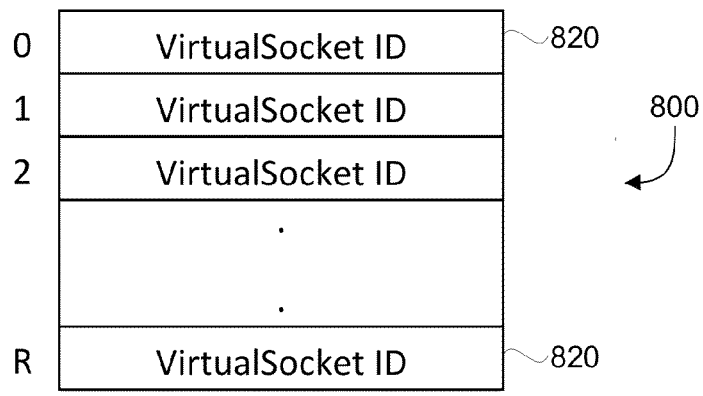
FIG. 6c is graphical representation of a reservation queue structure.

FIGS. 6a-6c depict structures that may be used in an exemplary embodiment of the TM Client 420 to support the described API. Those and other data types and variables that may be utilized by the TM Client 420 (not depicted in the figures) may be as follows:

(1) A Virtual Socket Structure 810, as depicted in FIG. 6a, may contain all information needed to implement a virtual stream socket. This may include state information 812, port binding 813, asynchronous callback information 814, remote host IP 815 and port 816, and information about current messages being processed 817.

(2) A tm_socket variable may contain an actual datagram socket descriptor, bound to port VPORT, used for listening for incoming messages. This socket should remain open as long as the client node agent or application (e.g., EBIF User Agent 410) is active, if possible. Otherwise, the socket may be opened and initialized as needed. Typically this socket is created via standard socket APIs. However, in some implementations, other socket acquisition APIs may be provided.

(3) A send_probability variable may contain a value representing the send probability used by vreserve( ) 606 to schedule packet transmissions via vsend( ) 612. Rather than representing the probability as a floating-point number (i.e., a value between 0 and 1), this value may be more conveniently represented as the product of the send probability and 65,536, rounded up to the nearest integer. The value contained in this variable may be sent out by the TM Server 210 in both Info 700 and ACK packets 720.

(4) A Virtual Socket Table 820, as depicted in FIG. 6b, may be a table (i.e., array, list, etc.) containing S virtual socket structures 810, where S is implementation specific based on available space, but is at most 16 according to the current exemplary embodiment. A socket ID is an index (e.g., 1 . . . S or 0 . . . S−1) into this table, as is the ConnID (i.e., connection ID) field 714, 724, 734 in TM packet headers. Socket ID may also be known as a Virtual Socket Descriptor.

(5) A verrno variable may be used by TM virtual sockets to report errors to programmers. This variable may be in addition to the errno variable used by standard socket APIs.

(6) A Reservation Queue 800, as depicted in FIG. 6c, may be an array (queue) of reservations, each identifying a virtual socket 820 that has a packet to send. Whenever a new packet is added to the Reservation Queue 800, or the first packet in the queue is sent, the time to send the next packet in the queue may be calculated and stored in reservation_slot. This calculation is given in the definition of reservation_slot, below, where current_slot_ID refers to the Slot ID at the time of calculation.

(7) A reservation_slot variable may be the Slot ID (or equivalent) in which the next packet is to be sent (see Reservation Queue). Whenever a new send_probability arrives at the client via either ACK 720 or Info packets 700, the value of reservation_slot must be re-calculated.

reservation_slot=current_slot_ID+(tm_random( ) % (131072.0/send_probability+0.5))

(8) A time_offset_msec variable may indicate a time offset, that when added to the internal clock time (GMT) on a client node (e.g., STB), synchronizes the time with the TM Server 210 and with other client nodes. Accurate times are needed to correctly calculate Slot IDs and for other capabilities that may be required.

Guaranteed Delivery of Messages

The following paragraphs provide more detail about an exemplary embodiment for implementing the guaranteed delivery of messages. First, details are provided about vsend( ) 612 in the context of Mode 1, assuming a reservation already exists for the specified virtual socket and the reserved Slot ID has arrived. Then there is a description of additions that may be necessary for the other modes.

As noted above, since vsend( ) 612, like its BSD socket counterpart, send( ) 506, is not guaranteed to send the entire message in one call, it will block until the message (or partial message) is sent. This may not be an issue with send( ) 506. But since various exemplary embodiments of the present invention may spread message packets out over time to avoid slot collisions, an application could be blocked for many seconds waiting for vsend( ) 612 to return. For this reason, vsend( ) 612 will return control back to the caller if the reservation time for a data packet is large. When the entire message is not sent, vsend( ) 612 may create a reservation for the next vsend( ) 612 call based on the current send_probability value.

In one exemplary implementation, vsend( ) 612 may break the message down into packets of (MTU−5) bytes (or less for the last packet), and send the packets as scheduled by vreserve( ) 606. Processing vsend(vsocket_descriptor, message_ptr, message_length) may occur as follows:

(1) Set data_sent=−1, and set resend_count=0.
(2) Set wait_time=vreserve(vsocket_descriptor).
(3) IF wait_time>VSEND_WASTE, set verrno=VSENDLATER, and return data_sent.
(4) IF resend_count>=VSEND_TRIES, set verrno=VMAXRESENDS, and return data_sent.
(5) IF wait_time>0, sleep for wait_time milliseconds, then go back to step 2.
(6) IF the message currently in progress for vsocket_descriptor is in send state, and its message buffer contains message_ptr[message_length], skip to step 8.
(7) Initialize the message progress data for vsocket_descriptor in the Virtual Socket Table (see discussion associated with FIG. 6b).
(8) IF all packets of the message have not yet been sent once, construct the next packet to send, update the virtual socket structure accordingly, and skip to step 11.
(9) If all sent packets have not yet been acknowledged, re-construct the lowest-numbered unacknowledged packet, setting the resend flag bit, update the message structure accordingly, increment resend_count, and skip to step 11.
(10) Update the Virtual Socket's message information, and return message_length.
(11) Wait for the next SLOT boundary, if necessary, and send the (re)constructed packet.
(12) Set data_sent=SoFarCt*(MTU−4), and go back to step 2.

This definition of vsend( ) 612 assumes that the receipt of both Info 700 and ACK packets 720 are being handled via asynchronous signaling interrupts while vsend( ) 612 is processing. In particular, it assumes that Info packets 700 are updating send_probability 708 and reservation_slot, and that ACK packets 720 are updating the SoFarCt 726, and ACKBits 728 fields in the virtual socket structure 810 defined by ConnID 724. There is no need for every data packet to be acknowledged by an ACK packet 720. In fact, the frequency of ACKs 720 may be inversely proportional to the rate of change in server load (i.e., send_probability) and the rate of reception of out-of-sequence packets. Ideally, under light load, an ACK 720 may be sent for every 4th received packet. In various exemplary embodiments, the only requirement may be that an ACK packet 720 must be generated for both the first and last packet of a message.

In Mode 2, nothing in the above changes, except that tm_socket is not allocated and bound to port VPORT until a virtual socket is opened with vsocket( ) 602, and vreserve( ) 606 will block until an Info packet 700 is received to define send_probability 708.

In Mode 3, vreserve( ) 606 and/or vsend( ) 612 must send a Probe packet 730 for the message, assuming send_probability is the Default Send Probability value, and receive an ACK packet 720 for the probe (providing an actual Send Probability value) before proceeding. Failure to receive this probe's ACK 720 before a short timeout (e.g., 3 seconds) causes the call to fail, and set an appropriate error in verrno.

Virtual Sockets

The following paragraphs further describe an exemplary embodiment of a Virtual Sockets implementation.

Traffic Management according to various exemplary embodiments of the present invention may endeavor to satisfy the following requirements using a single datagram socket (i.e., the tm_socket descriptor):

(1) Mimic the effect of multiple stream sockets;
(2) Listen for Info packets 700 that are broadcast from the TM Server 210; and
(3) Listen for alert messages that are unicast from application servers to the client node (e.g., STB 400). This is true in all three modes. The only difference is how long a datagram socket is held upon the start of listening.

The TM Client APIs, other than vsend( ) 612 and vrecv( ) 616, may not do anything with tm_socket. Instead, they may modify information in the Virtual Socket Table 820 (or Reservations Queue 800) that are subsequently used when sending or receiving data packets. For example, when an ACK packet 720 or Data packet 710 is received, header fields in the packet may be matched with data in the Virtual Socket Table 820 to determine which socket, and thus which callback function, is the actual recipient of the packet.

The assigned tm_socket is bound to VPORT (i.e., 1962) and "listens" for incoming traffic via the signaling mechanism. The packet_type field 702, 712, 722, 732 of incoming packets is examined, both to filter out non-TM packets, and to appropriately handle the various packet types that might be received. Info packets 700 may be handled internally by the TM Server 210 and TM Client 420 as disclosed in the Traffic Reporting and Client Clock Synchronization sections. ACK 720 and Data 710 packets (other than alerts) may contain a ConnID field 714, 724 (an index into the Virtual Socket Table) that identify the virtual socket connection to which the packet belongs. Alert message may be identified by a Flag field bit, Alert, and the ConnID and SeqNum bits are combined to define a 2-byte port number; the virtual socket bound to that port number is the recipient of the message.

The TM Client 420 may rely on asynchronous I/O signaling (SIGIO) to invoke the various TM internal routines when there is activity (or errors) on the tm_socket socket. For example, the TM asynchronous callback function associated with a virtual socket (via vasync( ) 605) may be invoked by signal handlers.

Various exemplary embodiments for the sending and receiving of data are described in more detail in the Guaranteed Delivery of Messages section.

Message Data Compression

One idiosyncrasy of the cable OOB networking context is that 99% of the traffic may consist of HTTP messages. Thus, a simple, static compression method can generate significant savings. A static table-based scheme, similar to the following, may be employed to compress all messages prior to transport. Decompression should be straightforward.

```
char *string[128] = {
    "HTTP",              /* Add other HTTP keywords */
    "CONTENT-LENGTH",    /* Add other header strings */
    "&",              /* Add other entities */
    "amr",               /* Add other IAM keywords */
    "\r\n",              /* Add other common multi-char strings */
                         /* NEED 123 MORE STRINGS */
                         /* Once all the strings are defined, a */
                         /* faster switch-based lookup mechanism */
                         /* can be implemented */
};
static char output[MAX_MSG];
static int outlen;
void compress(char *message, int inlen) {
    int pos, code;
    outlen = 0;
    for (pos=0; pos<inlen; code<0?pos++:0) {
        for (code=0; code<128; code++) {
            if ( (code[0] == message[pos])
                && !strncmp(&(message[pos]), string[code],
strlen(string[code]))
            ) {
                output[outlen++] = (char) -code;
                break;
            }
        }
    }
    /* result is in 'output', with length 'outlen' */
}
```

This compression scheme is intended to not corrupt binary data. Thus it may also be appropriate for non-HTTP protocols that may not always send text data.

Calculating Send Probability

The following paragraphs describe an exemplary method for calculating a send probability value.

The interface between the TM Server 210, which handles actual communication with TM Clients 420, and the bandwidth regulation code may be implemented using a single API call:

int got_packet (int size, int isOutOfOrder);

Whenever the TM Server 420 receives a packet from any client, it should call got_packet( ) immediately. The size of the packet (i.e., header+payload) may be passed in the size parameter. If the sequence number of the packet is not the expected value (i.e., the previous sequence number+1), then a non-zero (TRUE) value may be passed in isOutOfOrder, otherwise a 0 (FALSE) value may be passed in this parameter.

The return value of got_packet( ) may be either 0, or a positive, non-zero integer. If the return value is 0, no further action is required. However, if the value is non-zero, the return value should be used as the new Send Probability, and be communicated to all TM Clients 420 via ACK 720 and Info packets 700.

In an exemplary embodiment, the Send Probability value may be the ratio between a target bandwidth (per HFC Node), and the expected bandwidth (per HFC Node) for the immediate future. The target bandwidth is simply the configured maximum bandwidth (per HFC Node) multiplied by a small adjustment factor (e.g., 0.9) to keep the result just below the maximum. The expected bandwidth is the number of "active" STBs (i.e., client nodes) in each HFC Node that will be sending more packets. This may be estimated as $2*P/SP_{old}$, where P is the calculated average number of packets received per SLOT, and $SP_{old}$ is the previous value of Send Probability.

Additionally, an adjustment factor, K, may be periodically calculated to account for inaccuracies in system configuration values, and occasional transient effects.

Broadcast Frequency of Info Packets

The following paragraphs describe an exemplary method for determining the broadcast frequency of Info packets 700.

The frequency of Info packet 700 generation may be driven by the return value of got_packet( ). Whenever this function returns a non-zero value, a new Info packet 700 should be broadcast. Care should be taken to prevent too frequent or spurious generation of Info packets 700 broadcasts.

Specifically, got_packet( ) may return a non-zero send_probability value to disseminate via another Info packet broadcast whenever:

(a) 10 seconds have passed since the last Info packet broadcast, OR (b) At least 0.5 seconds have passed since the last Info packet broadcast AND out-of-order packets are being seen, OR (c) At least 0.5 seconds have passed since the last Info packet broadcast AND the packets/second rate is trending upward.

Otherwise, got_packet( ) may return a zero (0) and the prior value of send_probability remains valid.

Simulation of Bandwidth Regulation

Figure 7A:
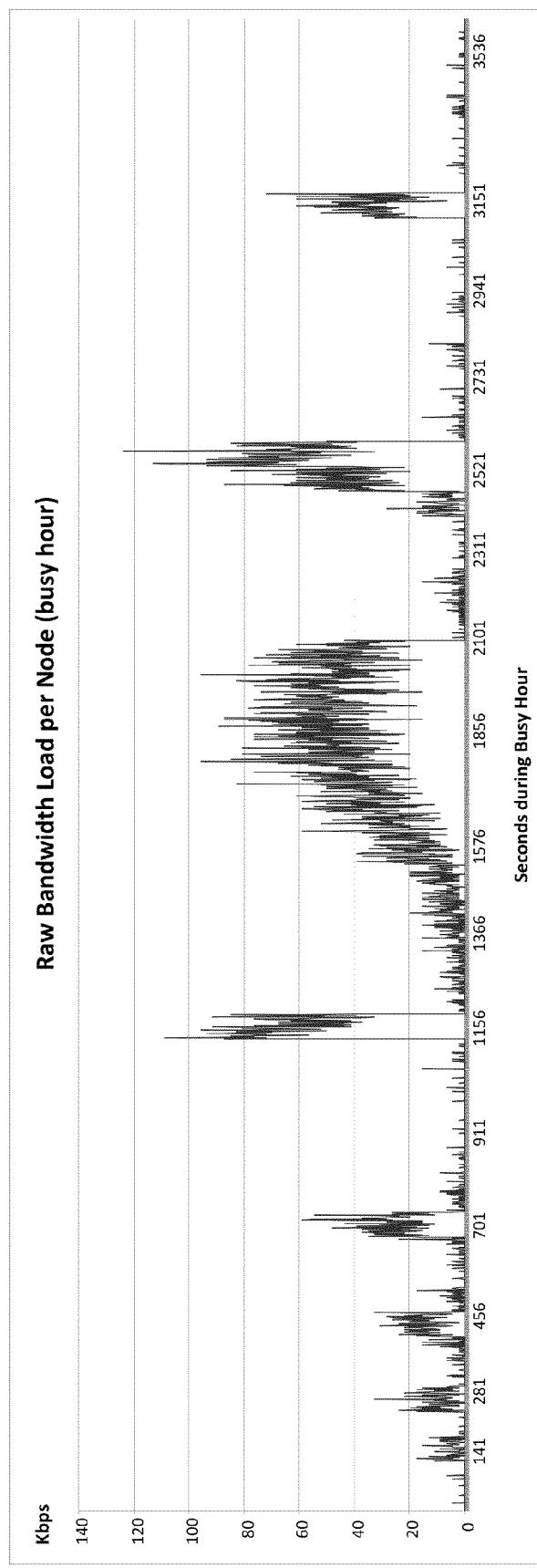
FIG. 7a is a graph depicting a simulation of a network load without bandwidth regulation.
Figure 7B:
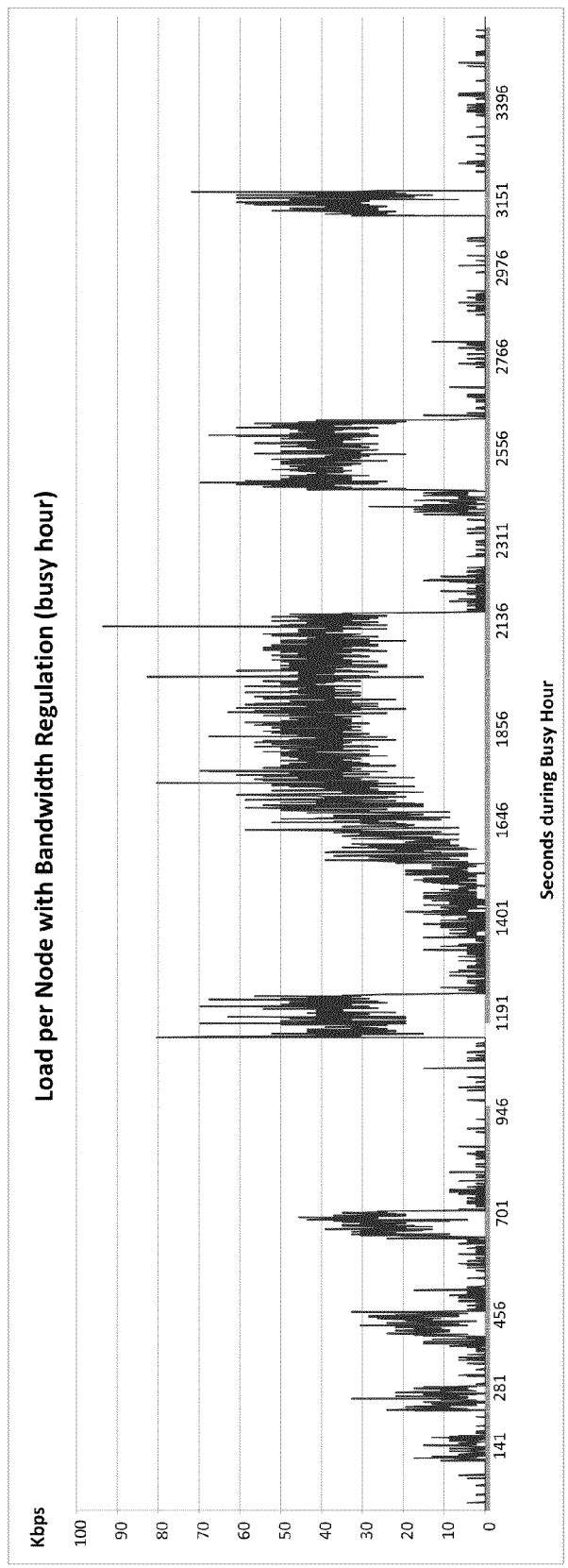
FIG. 7b is a graph depicting a simulation of a network load with bandwidth regulation.
Figure 7C:
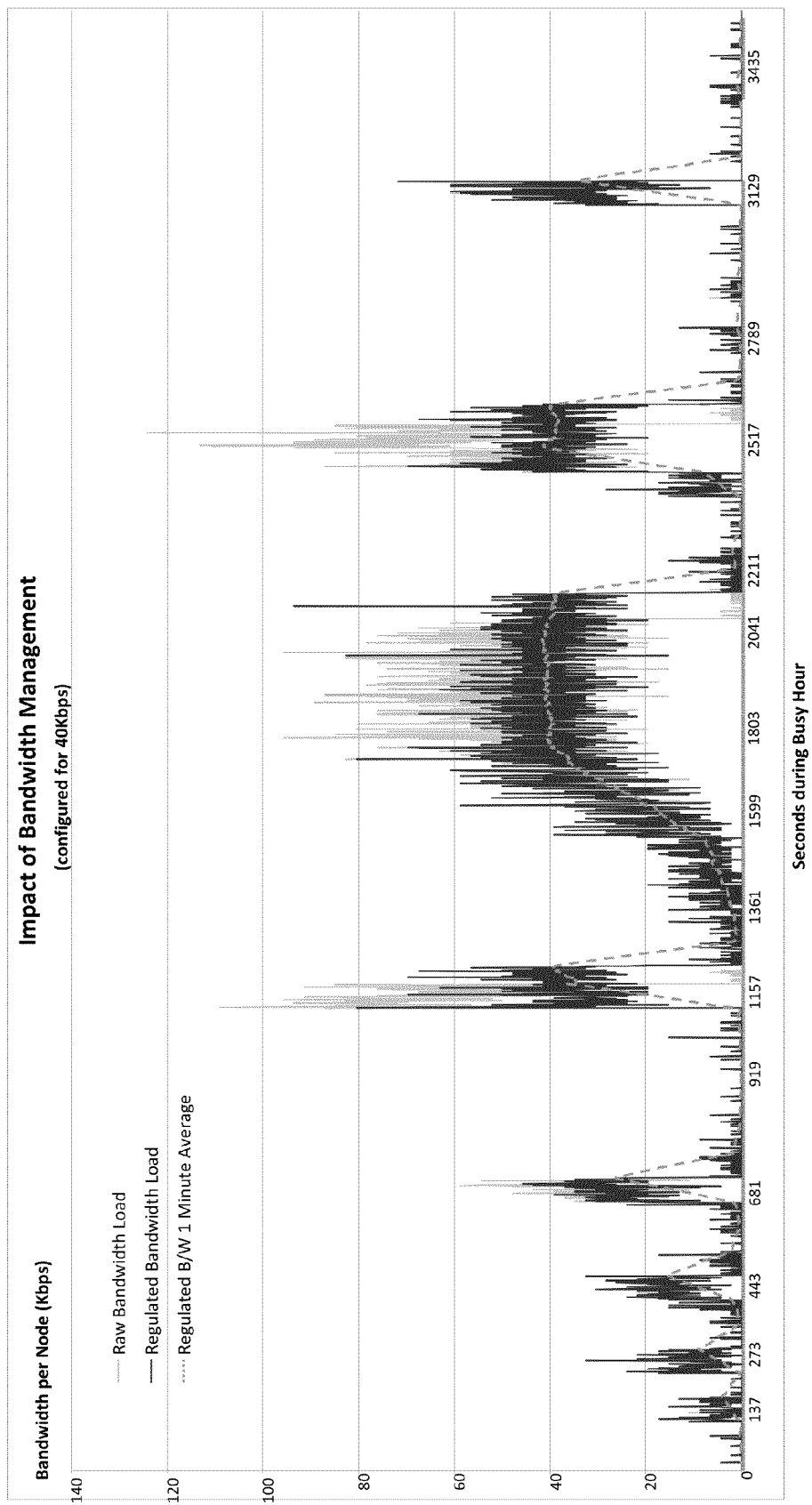
FIG. 7c is a graph depicting the difference between simulated network loads with and without bandwidth regulation.

This section presents a description of a simulation of an exemplary embodiment of the bandwidth regulation method according to an exemplary embodiment of the present invention. A description of how the simulation was conducted is presented along with a description of the results as depicted in FIGS. 7a-7c.

The simulation includes a modeling of a QPSK network wherein a TM Server 210 communicates with multiple TM Clients 420 via the network. The QPSK network model monitors the upstream and downstream throughput, and throws away packets in either direction that exceed bandwidth limits.

As the throughput approaches the theoretical bandwidth limit, the probability of packet loss approaches 1. Letting the theoretical maximum packet throughput upstream be (1/e)*256,000 bps=94,000 bps, and assuming the aggregate size of all upstream packets (including TM headers, and 28 bytes of UDP/IP headers) is S bytes (or s=S*8 bits), then the probability of the next packet being lost (and totally ignored) is given by: $P_{packet\_loss}(s)=(s/94,000)$. Programmatically, the following IF condition tests for this:

```
if ((tm_random( ) % 94000) < s) {
    ; /* Packet is LOST */
} else {
    ; /* Process the Packet */
}
```

In the simulation results depicted in FIGS. 7a-7c, a large (configurable) number of STBs 400 and HFC Nodes 300 were simulated for all 125 SLOTs in each second of a configurable test period, there set to 1 hour.

FIG. 7a is a graph depicting a simulation of a network load without bandwidth regulation in which the raw bandwidth load (per HFC Node 300) is averaged over each second of a 1 hour simulation.

FIG. 7b is a graph depicting a simulation of a network load with bandwidth regulation, configured for a maximum of 40 Kbps per HFC Node 300, when exposed to the same raw bandwidth traffic as in FIG. 7a. Note that the average traffic load is now capped at 40 Kbps, and the periods of high loading are a few seconds longer, in each case.

FIG. 7c is a graph depicting the difference between simulated network loads with and without bandwidth regulation. This graph overlays the two previous graphs and includes a line indicating a 60-second running average for the bandwidth managed traffic. This line shows the beneficial impact of the bandwidth regulation aspect of various exemplary embodiments of the present invention, as described herein.

Embodiments, or portions of embodiments, disclosed herein may utilize any of a wide variety of technologies including a special purpose computer, a computer system including a microcomputer, mini-computer, or mainframe, for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing any of the steps of the processes described herein.

It is to be appreciated that a set of instructions (e.g., computer software) that configures a computer operating system to perform any of the operations described herein may be contained on any of a wide variety of media or medium, as desired. Further, any data that is processed by the set of instructions might also be contained on any of a wide variety of media or medium. That is, the particular medium (e.g., memory) utilized to hold the set of instructions or the data used in the embodiments described herein may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

It is also to be appreciated that the various components described herein, such as a computer running executable computer software, may be located remotely and may communicate with each other via electronic transmission over one or more computer networks. As referred to herein, a network may include, but is not limited to, a wide area network (WAN), a local area network (LAN), a global network such as the Internet, a telephone network such as a public switch telephone network, a wireless communication network, a cellular network, an intranet, or the like, or any combination thereof. In various exemplary embodiments, a network may include one, or any number of the exemplary types of networks mentioned above, operating as a stand alone network or in cooperation with each other. Use of the term network herein is not intended to limit the network to a single network.

It will be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

The invention claimed is:

1. A method for regulating communication network bandwidth, the method comprising:
monitoring data traffic over a network using a centralized traffic management server, wherein the traffic management server continuously monitors a sample of incoming packets sent by at least one client node;
predicting network loads, wherein the traffic management server computes a load information based on a frequency, a rate of change, and a content of the sample of incoming packets;
scheduling network traffic, wherein the traffic management server and the at least one client node exchange a message to determine a scheduled time for an upcoming transmission of a data packet; and
transmitting data, wherein the at least one client node transmits the data packet over the network at the scheduled time.

2. The method of claim 1 further comprising retransmitting the data packet if necessary, wherein the at least one node retransmits the data packet if an acknowledgement is not received from the traffic management server.

3. The method of claim 1, wherein the network is an interactive digital cable television network.

4. The method of claim 3, wherein the cable television network comprises an enhanced television platform server communicating via an out-of-band channel using Hypertext Transfer Protocol (HTTP) over User Datagram Protocol (UDP) with a plurality of set-top boxes.

5. The method of claim 4, wherein the set-top boxes run interactive applications implemented using the Enhanced TV Binary Interchange Format (EBIF) running on an EBIF user agent.

6. The method of claim 1, wherein the traffic comprises at least one of:
interactive application communication, voting and polling data, television usage data, user preference and statistics traffic, and t-commerce information.

7. The method of claim 1, wherein the scheduling and the transmitting comprises:
setting a send-probability value in response to network traffic conditions on the traffic management server;
transmitting the send-probability value and clock synchronization information from the traffic management server to the at least one client node;
utilizing the send-probability value and synchronization information at the at least one client node to compute a randomized data transmission time;
transmitting a data packet by the at least one client node at the computed randomized data transmission time;
generating and sending an acknowledgement packet by the traffic management server to the at least one client nodes wherein the acknowledgement indicates success of a previous transmission and provides a new send-probability value for a next transmission; and
retransmitting the data packet by the at least one client node at a new data transmission time if an acknowledgement packet was not received.

8. The method of claim 7, wherein the send-probability value is inversely proportional to a window of time in which the next packet should be sent, the randomized data transmission time is a random time within the window, and each of the acknowledgement packet and data packet are transmitted on discrete timeslot boundaries within the window.

9. The method of claim 7, wherein the send-probability value is progressively increased at the at least one client node as time passes without transmission errors and acknowledgement timeouts.

10. The method of claim 7, wherein the send probability is decreased in response to at least one of: a transmission error and an acknowledgement timeout.

11. The method of claim 7, wherein the transmitting send-probability value and clock synchronization information from the traffic management server is done via a periodic broadcast to the at least one client node.

12. The method of claim 7, wherein the transmitting send-probability value and clock synchronization information from the traffic management server is done via narrowcast to at least one individually-addressed client node.

13. The method of claim 7, wherein the transmitting send-probability value and clock synchronization information from the traffic management server occurs after the at least one client node has sent a probe data packet to the traffic management server requesting a right to transmit the data packet.

14. The method of claim 1, wherein the network is an in-band cable television, DSL, or mobile broadband network.

15. The method of claim 1, wherein the network utilizes User Datagram Protocol (UDP) or Transmission Control Protocol (TCP).

16. The method of claim 1, wherein the traffic management server serves as a UDP-to-TCP relay server converting at least one UDP packet comprising traffic management information into at least one TCP packet.

17. The method of claim 2, wherein a traffic management client running on the at least one client node manages the scheduling of traffic and transmitting of data, and retransmitting of data in support of client applications.

18. The method of claim 17, wherein the traffic management client mimics a standard stream socket Application Programming Interface for the client application, providing for multiple simultaneous virtual stream sockets and connections while using a single datagram socket or port.

19. The method of claim 17, wherein the transmitting and retransmitting of data are implemented in a synchronous manner such that the client application waits for the scheduled data transmission time before sending the data.

20. The method of claim 17, wherein the transmitting and retransmitting of data are implemented in an asynchronous manner such that a call-back is issued by the traffic management client to the client application when the network is ready for data transmission.

21. The method of claim 2, wherein the scheduling, transmitting, and retransmitting steps are exposed to at least one application running on the at least one client node and are used to adjust a user-facing behavior.

22. The method of claim 2, wherein the transmitting and retransmitting of data further comprises compressing the data using a static table, wherein a plurality of standard HTTP message elements having strings values are each assigned a table index, the indexes are transmitted in lieu of the string values, and the string values are reconstructed upon receipt by utilizing the static table.

23. The method of claim 1, further comprising a bandwidth regulation server that is proactively responsive to an external event, the external event selected from: a time-of-day bandwidth load, a time-of-year bandwidth load, and a breaking news alert.

24. A system for regulating communication network bandwidth, the system comprising:
 a network;
 at least one client node
 a centralized traffic management server configured to:
  monitor data traffic over the network, wherein the traffic management server continuously monitors a sample of incoming packets sent by the least one client node;
  predict network loads, wherein the traffic management server computes a load information based on a frequency, a rate of change, and a content of the sample of incoming packets; and
  schedule network traffic, wherein the traffic management server and the at least one client node exchange a message to determine a scheduled time for an upcoming transmission of a data packet.

\* \* \* \* \*